(12) United States Patent
Kriedte et al.

(10) Patent No.: US 7,254,196 B2
(45) Date of Patent: Aug. 7, 2007

(54) SYMBOL TIMING FOR MIMO OFDM AND OTHER WIRELESS COMMUNICATION SYSTEMS

(75) Inventors: Kai Roland Kriedte, Woerden (NL); Tim Schenk, Heerle (NL); Allert van Zelst, Woerden (NL)

(73) Assignee: Agere Systems Inc., Allentown, PA (US)

( * ) Notice: Subject to any disclaimer, the term of this patent is extended or adjusted under 35 U.S.C. 154(b) by 765 days.

(21) Appl. No.: 10/644,702

(22) Filed: Aug. 20, 2003

(65) Prior Publication Data

US 2004/0100939 A1 May 27, 2004

Related U.S. Application Data

(60) Provisional application No. 60/429,081, filed on Nov. 26, 2002.

(51) Int. Cl.
  H04B 7/10 (2006.01)
  H04L 1/02 (2006.01)
(52) U.S. Cl. ..................... 375/347; 375/260
(58) Field of Classification Search ........ 375/259–260, 375/267, 299, 316, 347, 354, 355
See application file for complete search history.

(56) References Cited

U.S. PATENT DOCUMENTS

| 5,285,482 | A  | * | 2/1994 | Sehier et al. ............. 375/355 |
| 6,895,044 | B2 | * | 5/2005 | Happonen et al. .......... 375/231 |
| 2002/0122382 | A1 | | 9/2002 | Jianglei et al. |
| 2003/0118131 | A1 | * | 6/2003 | Kobylinski et al. ......... 375/341 |
| 2003/0219080 | A1 | * | 11/2003 | Alamouti et al. ........... 375/299 |
| 2004/0086065 | A1 | * | 5/2004 | Debak et al. ............... 375/347 |
| 2004/0184568 | A1 | * | 9/2004 | Kobylinski et al. ......... 375/341 |
| 2004/0202257 | A1 | * | 10/2004 | Mehta et al. ............... 375/267 |
| 2004/0218697 | A1 | * | 11/2004 | Liu ........................... 375/340 |
| 2004/0234003 | A1 | * | 11/2004 | Alamouti et al. ........... 375/267 |
| 2006/0209765 | A1 | * | 9/2006 | Li et al. ..................... 370/334 |

FOREIGN PATENT DOCUMENTS

EP    1 206 061 A1    5/2002
EP    1206061   A     5/2002

OTHER PUBLICATIONS

"Robust Frequency and Timing Synchronization for OFDM", by Timothy M. Schmidl and Donald C. Cox, IEEE Transactions on Communications, vol. 45, No. 12, Dec. 1997, pp. 1613-1621.

"A Technique for Orthogonal Frequency Division Multiplexing Frequency Offset Correction", by Paul H. Moose, IEEE Transactions on Communications, vol. 42, No. 10, Oct. 1994, pp. 2908-2914.

"Synchronization for MIMO OFDM Systems", by Apurva N. Mody and Gordon L. Stüber; School of Electrical Computer Engineering, Georgia Institute of Technology, Atlanta, GA, Nov. 2001; 5 pages.

* cited by examiner

Primary Examiner—Jean B. Corrielus

(57) ABSTRACT

Symbol timing for a wireless communication system, such as a multiple-input multiple-output (MIMO) orthogonal frequency division multiplexing (OFDM) wireless LAN system, is determined by summing the powers for an appropriate set of channel impulse responses, integrating this power summation over an appropriate window (e.g., equivalent to the guard interval), and identifying the time at which the maximum integration occurs. Depending on the implementation, symbol timing can be determined for each receiver branch individually or for all receiver branches jointly. In either case, the determined symbol timing(s) can minimize the amount of inter-symbol and inter-channel interferences that are invoked in the system.

25 Claims, 6 Drawing Sheets

SYMBOL TIMING FOR MIMO OFDM AND OTHER WIRELESS COMMUNICATION SYSTEMS

CROSS-REFERENCE TO RELATED APPLICATIONS

This application claims the benefit of the filing date of U.S. provisional application no. 60/429,081, filed on Nov. 26, 2002 as attorney docket no. Kriedte 4-1-2. The subject matter of this application is also related to U.S. patent application Ser. no. 10/006,900 filed Nov. 13 2001 as attorney docket no. Van Nee 17 and issued as U.S. Pat. No. 7,099,269 on Aug. 29, 2006. ("the '900 application"), the teachings of which are incorporated herein by reference.

BACKGROUND OF THE INVENTION

1. Field of the Invention

The present invention relates to symbol timing in the receivers of wireless communication systems, and, in particular, in the receivers of multiple-input multiple-output (MIMO) orthogonal frequency division multiplexing (OFDM) wireless local area networks (LANs) and broadband wireless access systems.

2. Description of the Related Art

Combining the spectral efficiency of MIMO with the robustness against frequency-selective fading and narrowband interference of OFDM is regarded as a very promising starting point for future high-data-rate radio communication systems. This is especially true for wireless LANs (WLANs), where MIMO would open the door to high-data-rate extensions by extending current OFDM standards in the 2.4 and 5 GHz bands.

In the recent past, various transmission schemes for MIMO have been proposed, but the impact of system imperfections have generally been neglected. Furthermore, the systems were typically assumed to be perfectly synchronized. Thus, signal impairments caused by the radio system (e.g., frequency offset, phase noise) have not been considered.

Various synchronization techniques for single-input single output (SISO) OFDM systems have been proposed in the literature. See, e.g., T. M. Schmidl and D. C. Cox, *Robust Frequency and Timing Synchronization for OFDM*, IEEE Transactions on Communications, vol. 45, no. 12, December 1997, pp. 1613-1621, and P. H. Moose, *A Technique for Orthogonal Frequency Division Multiplexing Frequency Offset Correction*, IEEE Transactions on Communications, vol. 42, no. 10, October 1994, pp. 2908-2914, the teachings of both of which are incorporated herein by reference. Few techniques, however, have been proposed to synchronize MIMO OFDM systems. Data-aided synchronization for MIMO OFDM systems is proposed in one paper, but the performance exploration of the proposed techniques is very concise. See A. N. Mody and G. L. Stüber, *Synchronization for MIMO OFDM Systems*, IEEE Global Communications Conference 2001, vol. 1, November 2001, pp. 509-513, the teachings of which are incorporated herein by reference.

SUMMARY OF THE INVENTION

Problems in the prior art are addressed in accordance with the principles of the present invention by low-complexity and time-efficient techniques for time and frequency synchronization of MIMO OFDM systems. According to certain embodiments, the techniques rely on a preamble having training sequences simultaneously transmitted from the various transmit antennas and are, thus, especially suitable for burst-mode communication. From analysis, it can be shown that the accuracy of frequency synchronization is close to the Cramér-Rao lower bound and increases for increasing rms delay spreads. Furthermore, application of the proposed algorithms leads to a only small degradation in bit error rate (BER) performance as compared to a perfectly synchronized MIMO system.

In one embodiment, the present invention is a method implemented in a receiver of a MIMO system. According to the method, signals are received from a plurality of transmitter antennas, and, for each of a plurality of channels originating from the transmit antennas, a channel impulse response (CIR) value is generated characterizing the impulse response of the channel. The CIR values are summed for the plurality of channels, and the summed CIR values are integrated over a specified window. Symbol timing in the received signals is determined based on the integrated summed CIR values, and the received signals are processed based on the determined symbol timing.

In another embodiment, the present invention is a receiver for a MIMO system. The receiver comprises a plurality of receiver antennas, a receiver branch for each different receiver antenna, and a symbol decoder. Each receiver antenna is adapted to receive signals from a plurality of transmitter antennas in the MIMO system, and each receiver branch has a transform adapted to transform a corresponding received signal into a plurality of transformed components. The symbol decoder is adapted to receive transformed components from each transform and to detect symbols. Processing within each receiver branch is based on symbol timing determined for each receiver branch, where at least one receiver branch is adapted to determine its symbol timing by: (a) for each of a plurality of channels originating from the transmit antennas, generating a CIR value characterizing impulse response of the channel; (b) summing the CIR values for the plurality of channels; (c) integrating the summed CIR values over a specified window; and (d) determining the symbol timing in the received signals based on the integrated summed CIR values.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Basics of MIMO OFDM

In a MIMO OFDM system, multiple OFDM signals are transmitted simultaneously on different transmit antennas, but at the same radio frequency. These signals mix together in the air when the through-the-air channels give a certain level of dispersion and are separated at a receiver when proper detection algorithms are used. For many of these detection techniques, it is important that the channel characteristics be known at the receiver. Different training techniques have been proposed to determine these channel characteristics at the receiver. When the communication system is a MIMO system having $N_t$ transmit antennas and $N_r$ receive antennas, there are $N_tN_r$ different channel impulse responses (CIRs), each corresponding to a transmission path from one of the transmit antennas to one of the receive antennas. To estimate the channels correctly and to perform proper detection of the transmitted data, the optimal symbol timing instant should be determined, which instant determines where to start the interpretation of the received signal. In a typical OFDM system, this means finding an optimal position for the discrete Fourier transform (DFT) window used to process each received signal.

Since most MIMO algorithms are designed for flat fading narrowband channels, in order to combine MIMO with the multicarrier technique OFDM, MIMO detection should be carried out for each OFDM subcarrier. If the transmitter has $N_t$ transmit antennas, then every subcarrier carries $N_t$ data streams.

Figure 1:
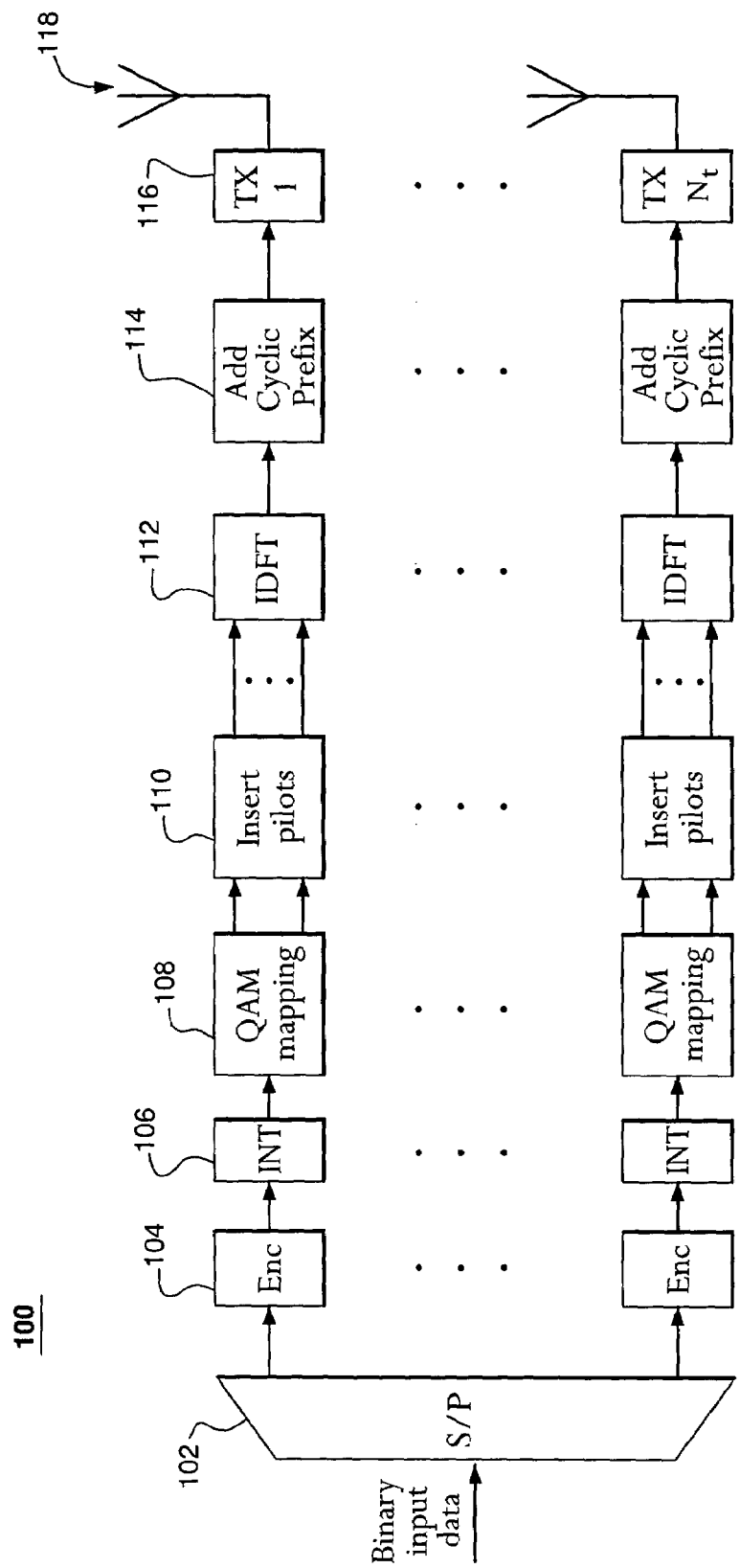
FIG. 1 shows a block diagram of a MIMO OFDM transmitter.

FIG. 1 shows a block diagram of a MIMO OFDM transmitter 100. Demultiplexer (i.e., serial-to-parallel converter) 102 splits the data stream into $N_t$ parallel data substreams. Encoding (104), interleaving (106), and QAM mapping (108) are applied to each data substream. Pilot insertion (110) and inverse discrete Fourier transformation (IDFT) (112) are applied to the outputs of each QAM block mapping. In particular, for each of the $N_t$ data substreams, an IDFT is applied to sets of $N_s$ symbols, where $N_s$ is the number of OFDM subcarriers. A cyclic prefix is added (114) to the output of each IDFT, and each resulting signal is transmitted by an RF transmitter 116 from a corresponding antenna 118.

Figure 2:
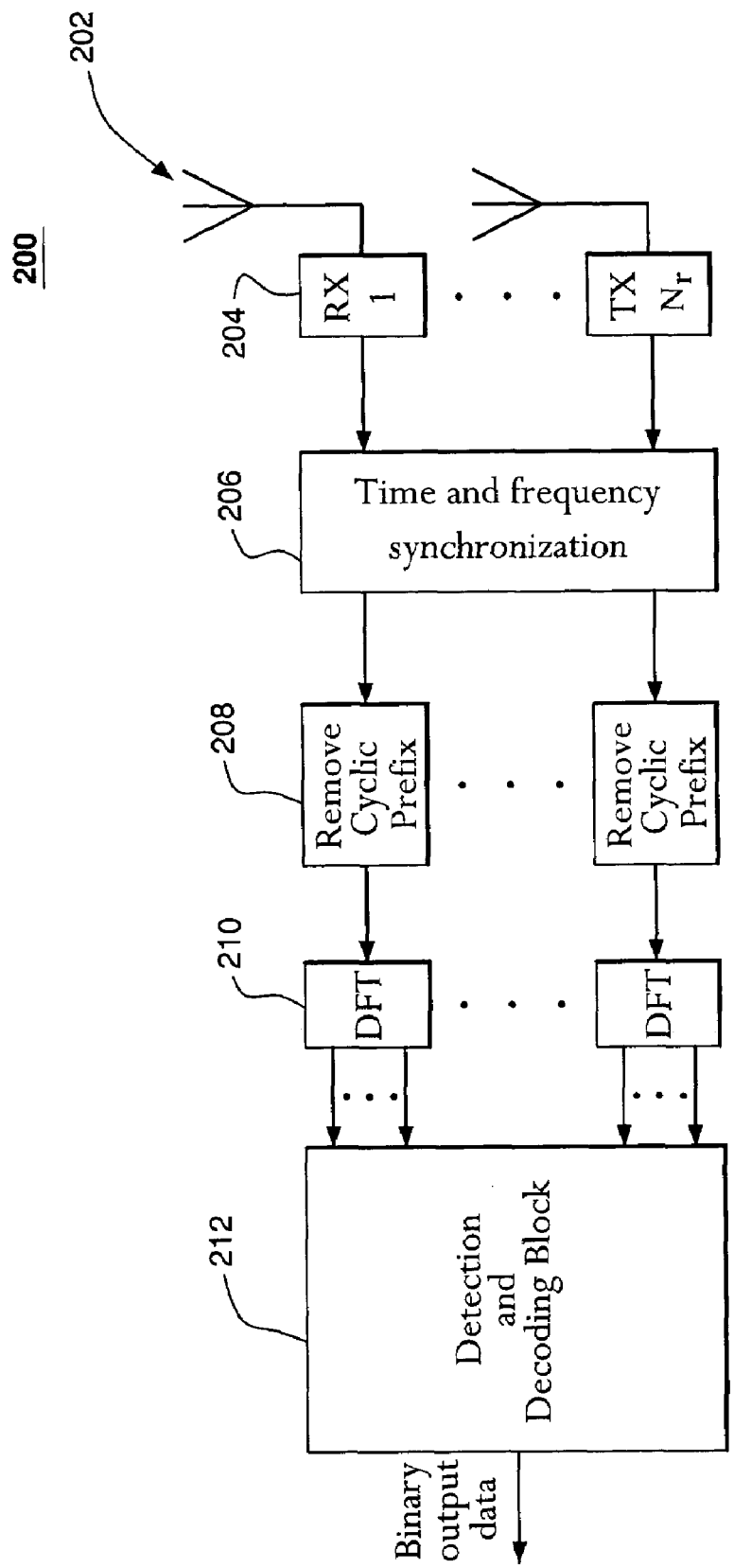
FIG. 2 shows a block diagram of a MIMO OFDM receiver, according to one embodiment of the present invention.

FIG. 2 shows a block diagram of a MIMO OFDM receiver 200, according to one embodiment of the present invention. Receiver 200 has $N_r$ antennas 202, each connected to a corresponding RF receiver 204. The cyclic prefix is removed (208) from the output of each RF receiver 204, and time and frequency synchronization (206) is applied to the signals. The subcarrier information for each of the $N_r$ receiver branches is then separated using a corresponding DFT 210. In particular, each DFT 210 generates information for each of $N_s$ subcarriers. Corresponding data from the different DFTs are then routed to detection and decoding block 212, which implements MIMO detection for the different subcarriers, phase-drift correction, de-mapping, de-interleaving, and decoding to recover (ideally) the original binary input data of FIG. 1.

Synchronization Techniques

In an OFDM system, frequency offset (FO) causes a reduction of the amplitude of each detected subcarrier after the DFT (e.g., 210 in FIG. 2), introduces inter-carrier interference (ICI), and gives a rotation progressive in time of the received constellation points. An offset in the symbol timing causes rotation of the subcarriers, which is zero at the center subcarrier and increases linearly towards the outer subcarriers. When this offset is above a certain value, it also introduces inter-symbol interference (ISI). To reduce these effects, time and frequency synchronization is performed (e.g., 206 in FIG. 2), preferably before the start of the reception of the data. In order to perform synchronization tasks, each data packet is typically preceded by a preamble, i.e., a section of known data. Channel estimates can also be drawn from the preamble phase.

Preamble Design

For accurate symbol timing and channel estimation, the receiver should be able to distinguish from which transmit antenna a received signal component originates. Several preamble formats have been proposed using different OFDM training symbols on the various transmit antennas, which training symbols are separated in time, in frequency, or by code. Another possibility is the use of single-carrier orthogonal codes, such as Frank-Zadoff codes, which have good periodic correlation properties, as described in the '900 application. In this case, each preamble is formed by a concatenation of multiple repetitions of a code, with a different cyclic shift applied to it for each different transmit antenna. In order to avoid ISI during channel impulse response (CIR) recovery, the cyclic shift should at least span the duration of the maximal-length CIR.

Frame Detection/Coarse Timing

In certain wireless communications systems, the data is sent in bursts. As such, the receiver has no a priori knowledge about packet arrival times. In that case, a frame detection (FD) algorithm detects when a packet is received and thus should be able to identify the system preamble at any time. This preamble detection algorithm can also be used as a coarse timing (CT) algorithm, since it inherently provides a rough estimate for the starting point of the packet. Typical FD algorithms are based on the correlation between the repeated symbols/codes constituting the preamble.

According to one algorithm based on the maximum-correlation (MC) criterion, the start of the frame is detected as the instant that the complex correlation (between two subsequently received frames of $N_c$ samples on the $N_r$ receive antennas, where $N_c$ is the length of the orthogonal code) reaches its maximum value. Another algorithm is based on the maximum-normalized-correlation (MNC) criterion, which is a modification of the Schmidl criterion.

Frequency Synchronization

Frequency synchronization corrects for frequency offset caused by a difference between the oscillator frequencies of the transmitter and the receiver. The received signals can be compensated based on an estimate of this frequency offset generated using the phase of the complex correlation between two consecutive received symbols/codes, when all transmit branches of one MIMO transmitter use the same oscillator, which is a valid assumption if the different transmit branches are co-located.

Symbol Timing

Symbol timing in an OFDM system decides where to place the start of the DFT window within the OFDM symbol. Although an OFDM system exhibits a guard interval (GI), making it somewhat robust against timing offsets, symbol timing different from the optimal symbol timing point may introduce ISI and ICI in a multipath environment.

Depending on the particular implementation, according to embodiments of the present invention, symbol timing is based on some or all of the $N_tN_r$ channel impulse responses, which can be acquired using any suitable kind of training algorithms (e.g., using frequency-division multiplexing (FDM), code-division multiplexing (CDM), time-division multiplexing (TDM), or a combination thereof). This symbol timing minimizes the amount of power of the CIR that falls outside a specified window, e.g., having duration as long as the guard interval, and maximizes the amount of power that falls inside this window. By doing this, the amount of ISI and ICI invoked can be minimized, thereby optimizing the performance of data reception.

First, the received and frequency-corrected signal is correlated with the known training sequence c. This yields estimates of the $N_tN_r$ channel impulse responses. For the preamble described in the '900 application, the correlation output $\eta_n$ at the nth receiver at time i is given by Equation (1) as follows:

$$\eta_n[i] = \left\| \sum_{k=0}^{N_c-1} x_n[i-k] \cdot c^*_{N_c-k} \right\|^2, \quad (1)$$

where $x_n[i-k]$ is the received signal on antenna n at sample time (i-k), * denotes the complex conjugate, and $\|..\|^2$ denotes power (i.e., magnitude squared).

The estimates of the impulse responses corresponding to the channel elements of the $N_t$ transmit antennas to receive antenna n are separated serially in time, spaced q samples apart. As described in the next two sections, symbol timing can then be determined for each MIMO OFDM receiver branch individually or for all receiver branches jointly. In particular, symbol timing for a particular receiver branch or for the whole MIMO receiver may be found by adding the powers of an appropriate set of impulse responses. This sum is then window-integrated over $N_g$ samples, where $N_g$ is (preferably) the length of the guard interval of the OFDM symbol. The symbol timing is then determined by finding the maximum of the integration output.

Symbol Timing for Each MIMO OFDM Receiver Branch Individually

Figure 3:
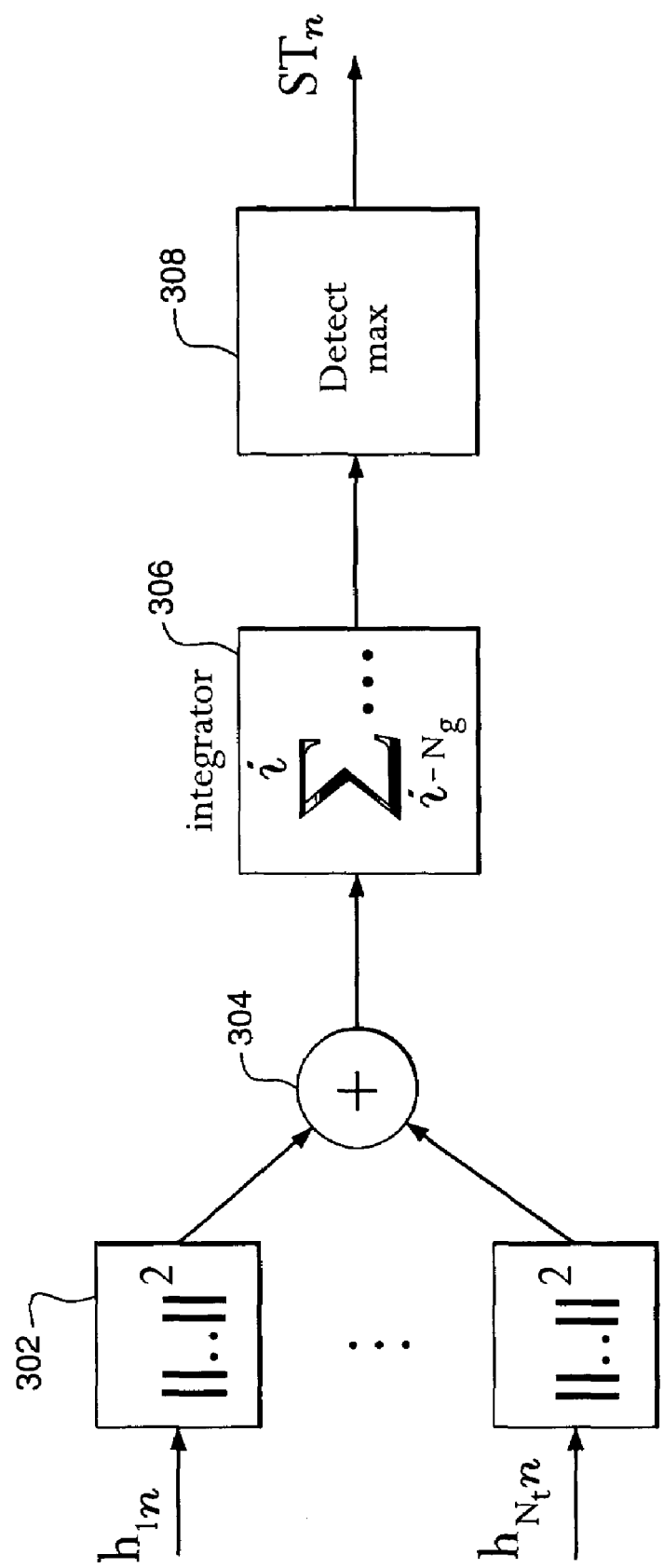
FIG. 3 shows a block diagram of the processing implemented at each RF receiver of the MIMO OFDM receiver of FIG. 2, according to one embodiment of the present invention in which symbol timing for each of the $N_r$ MIMO OFDM receiver branches is determined individually.

FIG. 3 shows a block diagram of the processing according to one embodiment of the present invention in which symbol timing for each of the $N_r$ MIMO OFDM receiver branches is determined individually. In particular, FIG. 3 shows an implementation of symbol timing determination for the nth receiver branch. In this case, the symbol timing instant for receiver branch n is determined using the $N_t$ CIRs corresponding to the through-the-air channels from all $N_t$ transmitter antennas to receiver antenna n.

In particular, the powers (302) of the time-domain representations of the CIRs $h_{1n}$ (corresponding to the CIR from transmitter antenna 1 to receiver antenna n) to $h_{N_t n}$ (corresponding to the CIR from transmitter antenna $N_t$ to receiver antenna n) are summed (304). For the preamble described in the '900 application, each power operation 302 is equivalent to an evaluation of $\eta_n$ using Equation (1) for the corresponding channel. The sum is then window-integrated (306) over a window that is preferably as long as the maximum tolerable delay spread ($N_g$ samples), although, in theory, a window of any arbitrary length can be used. In many cases, $N_g$ will be equal to the length of the guard interval. In a digital system, the integrator can be implemented using a simple summation. The optimal symbol timing instant ($ST_n$) for the nth receiver branch is found to be the instant for which the output of the integrator is maximal (308), according to Equation (2) as follows:

$$ST_n = \arg\max_i \sum_{i-N_g}^{i} \sum_{m=1}^{N_t} \|h_{mn}(i)\|^2 \quad (2)$$

When using the preamble described in the '900 application, the optimal symbol timing instant $ST_n$ is found using the correlation outputs of Equation (1) according to Equation (2') as follows:

$$ST_n = \arg\max_i \sum_{k=1}^{N_t} \sum_{m=0}^{N_g-1} \eta_n[i-(k-1)\cdot q - m] \quad (2')$$

Figure 4:
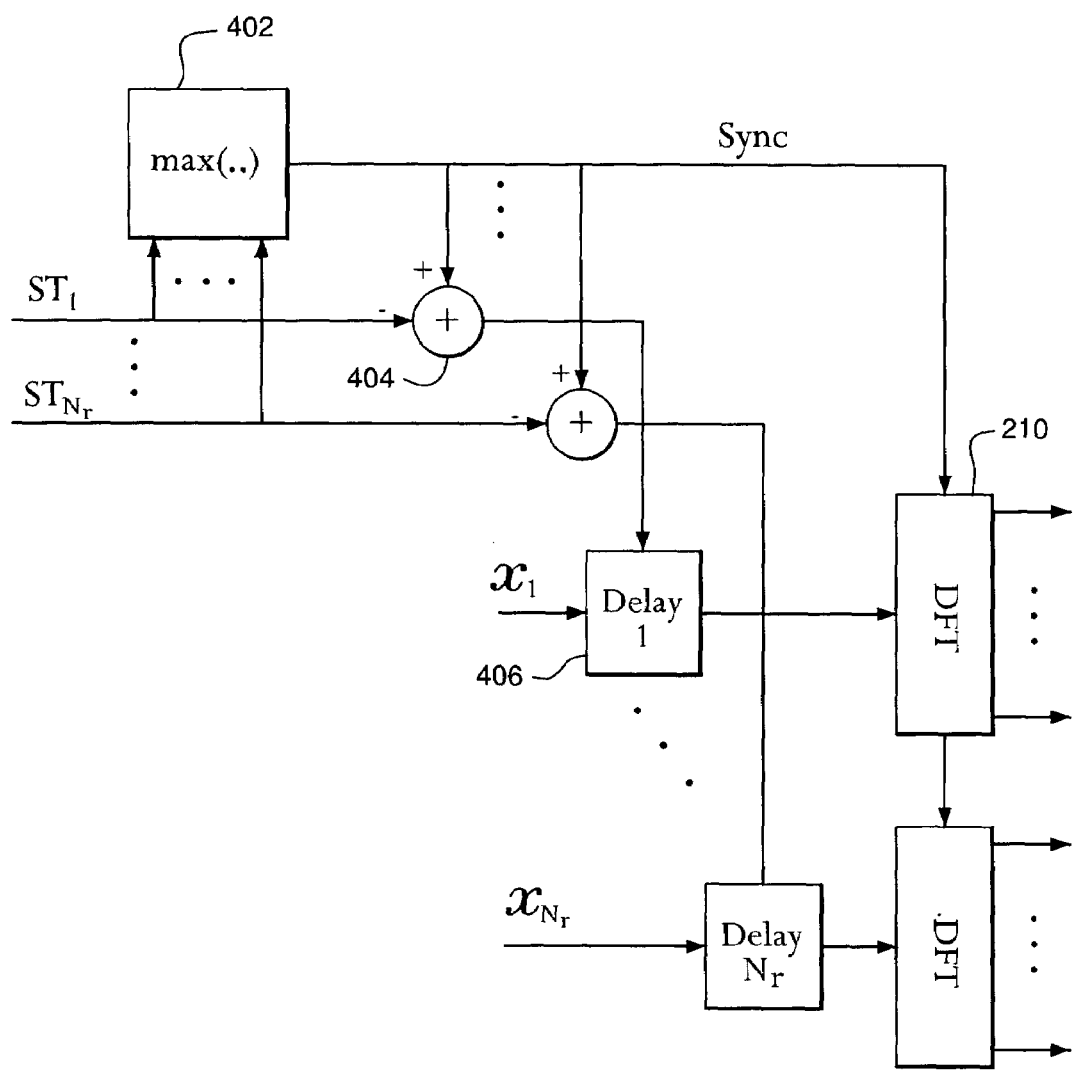
FIG. 4 shows a block diagram of a structure that could be implemented in the context of the MIMO OFDM receiver of FIG. 2 to use the $N_r$ different optimal symbol timings for the $N_r$ receiver branches.

FIG. 4 shows a block diagram of a structure 400, which could be implemented in the context of MIMO OFDM receiver 200 of FIG. 2 to use the $N_r$ different optimal symbol timings $ST_n$ for the $N_r$ receiver branches. In particular, max block 402 selects the maximum of the $N_r$ different symbol timings $ST_i$ and uses that maximum symbol timing $ST_{max}$ to generate the sync control signal that determines when to operate each of the $N_r$ DFTs 210 of FIG. 2. To compensate for timing differences between the different channels, the received signal $x_i$ for each of the $N_r$ receive branches is delayed (406) based on the difference (404) between the maximum symbol timing $ST_{max}$ and the symbol timing $ST_n$ for that branch. Although the implementation of FIG. 4 selects the maximum symbol timing $ST_{max}$ and corrects each individual receiver branch for timing differences relative to $ST_{max}$, in alternative embodiments, a different symbol timing could be selected with corrections made for the various receiver branches relative to that selected symbol timing.

Symbol Timing for All MIMO OFDM Receiver Branches Jointly

Figure 5:
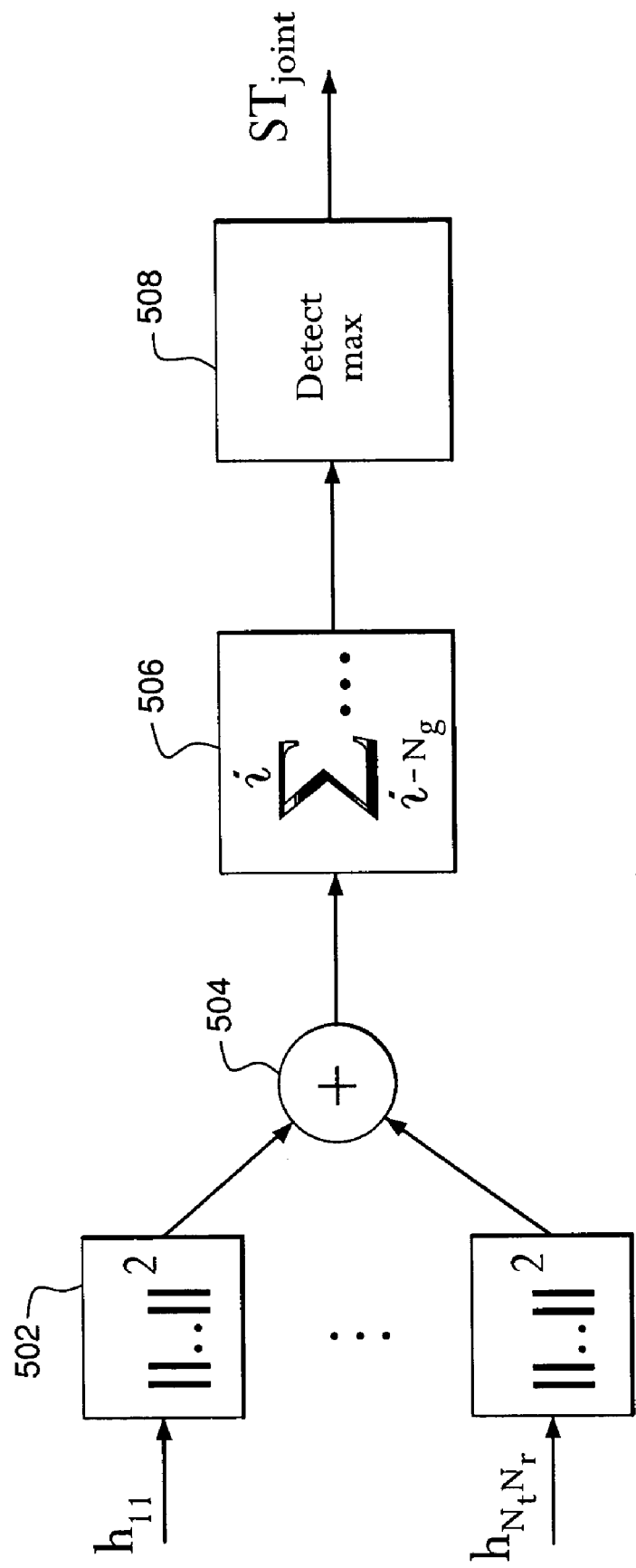
FIG. 5 shows a block diagram of the processing according to another embodiment of the present invention in which symbol timing for all of the $N_r$ MIMO OFDM receiver branches is determined jointly.

FIG. 5 shows a block diagram of the processing according to another embodiment of the present invention in which symbol timing for all of the $N_r$ MIMO OFDM receiver branches is determined jointly. In this case, a single, optimal symbol timing instant for all of receiver branches is determined using all $N_tN_r$ CIRs corresponding to the through-the-air channels from all $N_t$ transmitters to all $N_r$ receivers.

In particular, the powers (502) of the time-domain representations of the CIRs $h_{11}$ (corresponding to the CIR from transmitter antenna 1 to receiver antenna 1) to $h_{N_tN_r}$ (corresponding to the CIR from transmitter antenna $N_t$ to receiver antenna $N_r$) are summed (504). Here, too, each power operation 502 is equivalent to an evaluation of $\eta_n$ using Equation (1) for the corresponding channel. The sum is then window-integrated (506) over a window similar to the window used in the processing of FIG. 3. The optimal joint symbol timing instant ($ST_{joint}$) for the entire receiver is found to be the instant for which the output of the integrator is maximal (508), according to Equation (3) as follows:

$$ST_{joint} = \underset{i}{\operatorname{argmax}} \sum_{i-N_g}^{i} \sum_{m=1}^{N_t} \sum_{n=1}^{N_r} \|h_{mn}(i)\|^2 \qquad (3)$$

When using the preamble described in the '900 application, the optimal joint symbol timing instant $ST_{joint}$ is found using the correlation outputs of Equation (1) according to Equation (3') as follows:

$$ST_{joint} = \underset{i}{\operatorname{argmax}} \sum_{n=1}^{N_r} \sum_{k=1}^{N_t} \sum_{m=0}^{N_g-1} \eta_n[i-(k-1)\cdot q - m] \qquad (3')$$

Figure 6:
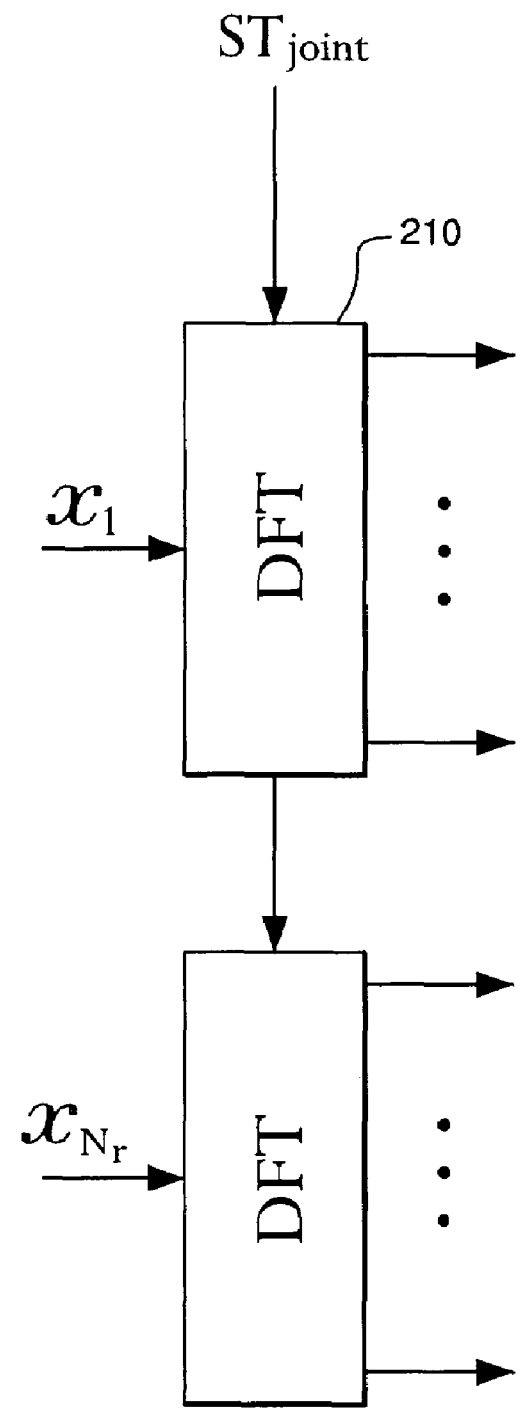
FIG. 6 shows a block diagram of a structure that could be implemented in the context of the MIMO OFDM receiver of FIG. 2 to use the joint symbol timing $ST_{joint}$ for the $N_r$ receiver branches.

FIG. 6 shows a block diagram of a structure 600, which could be implemented in the context of MIMO OFDM receiver 200 of FIG. 2 to use the joint symbol timing $ST_{joint}$ for the $N_r$ receiver branches. In particular, the joint symbol timing $ST_{joint}$ is used to generate the sync control signal that determines when to operate each of the $N_r$ DFTs 210 of FIG. 2.

Alternatives

Although some of the previous description assumed a particular preamble design, those skilled in the art will understand that the present invention can be implemented in the context of applications that involve a wide variety of preamble designs.

Although the present invention has been described in the context of algorithms that are based on the sum of the powers of the channel impulse responses, the present invention is not so limited. For example, the present invention could be implemented in the context of algorithms that are based on the sum of the amplitudes of the CIRs, where the CIR amplitudes correspond to the square roots of the CIR powers.

In preferred embodiments of the present invention, the inverse and forward DFTs are implemented using inverse and forward fast Fourier transforms (FFTs). Furthermore, the present invention could be implemented in the context of algorithms that are based on other types of transforms, such as discrete Hartley transforms, cosine transforms, and sine transforms.

Although the present invention has been described in the context of MIMO OFDM systems, the present invention can also be implemented in other contexts, such as broadband MIMO systems using rake receivers and narrowband MIMO schemes. The present invention could also be used for fixed services dealing with multiple channels, such as in optical systems.

The present invention may be implemented as circuit-based processes, including possible implementation as a single integrated circuit, a multi-chip module, a single card, or a multi-card circuit pack. As would be apparent to one skilled in the art, various functions of circuit elements may also be implemented as processing steps in a software program. Such software may be employed in, for example, a digital signal processor, micro-controller, or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

We claim:

1. In a receiver of a multiple-input multiple-output (MIMO) system, the receiver having a plurality of receiver antennas, a method comprising:
    (a) receiving signals from a plurality of transmitter antennas, each transmitter antenna transmitting multiple channels;
    (b) for each of a plurality of channels originating from the transmit antennas, estimating a CIR value characterizing channel impulse response (CIR) of the channel;
    (c) summing the CIR values for the plurality of channels to generate a plurality of summed CIR values;
    (d) integrating the summed CIR values over a specified window to generate an integrated summed CIR value;
    (e) determining symbol timing in the received signals based on the integrated summed CIR value; and
    (f) processing the received signals based on the determined symbol timing, wherein:
        a plurality of integrated summed CIR values are generated corresponding to a plurality of different instances of the specified window, each instance corresponding to integrating a different set of summed CIR values for the plurality of channels; and
        the determined symbol timing is based on selecting a maximum integrated summed CIR value of the plurality of integrated summed CIR values.

2. The method of claim 1, wherein the MIMO system is a MIMO orthogonal frequency division multiplexing (OFDM) system.

3. The method of claim 1, wherein each CIR value corresponds to power of the CIR.

4. The method of claim 3, wherein each CIR value is based on a correlation between a corresponding received signal and a known training sequence.

5. The method of claim 1, wherein the specified window has a duration substantially equal to the length of a guard interval of symbols in the received signals.

6. The method of claim 1, wherein the specified window has a duration substantially equal to a maximum tolerable delay spread for the received signals.

7. The method of claim 1, wherein the processing of the received signals includes generating a discrete Fourier transform (DFT) for each received signal, wherein timing of the DFT is based on the determined symbol timing.

8. The method of claim 1, wherein the plurality of channels corresponds to a single antenna of the receiver.

9. The method of claim 1, wherein a different symbol timing is determined for each different receiver antenna.

10. The method of claim 9, wherein:
timing of the processing of the received signals for each different receiver antenna is based on the maximum symbol timing for all of the receiver antennas; and
at least one received signal is delayed based on a timing difference between the maximum symbol timing and the symbol timing determined for said at least one received signal.

11. The method of claim 1, wherein the plurality of channels corresponds to all of the antennas of the receiver.

12. The method of claim 11, wherein a single, joint symbol timing is determined for all of the receiver antennas by:
(b) estimating the CIR value for each of the plurality of channels corresponding to all of the antennas of the receiver;
(c) summing the CIR values for the plurality of channels corresponding to all of the antennas of the receiver to generate the plurality of summed CIR values;
(d) integrating the summed CIR values over a specified window to generate the integrated summed CIR value; and
(e) determining the single, joint symbol timing in the received signals based on the integrated summed CIR value.

13. The method of claim 1, wherein the determined symbol timing corresponds to minimal CIR power falling outside of the specified window and maximal CIR power falling inside the specified window.

14. A receiver for a multiple-input multiple-output (MIMO) system, the receiver comprising:
a plurality of receiver antennas, each adapted to receive signals from a plurality of transmitter antennas in the MIMO system, each transmitter antenna transmitting multiple channels;
a receiver branch for each different receiver antenna, each receiver branch having a transform adapted to transform a corresponding received signal into a plurality of transformed components;
a symbol decoder adapted to receive transformed components from each transform and to detect symbols, wherein:
processing within each receiver branch is based on symbol timing determined for each receiver branch;
at least one receiver branch is adapted to determine its symbol timing by
(a) for each of a plurality of channels originating from the transmit antennas, estimating a CIR value characterizing channel impulse response (CIR) of the channel;
(b) summing the CIR values for the plurality of channels to generate a plurality of summed CIR values;
(c) integrating the summed CIR values over a specified window to generate an integrated summed CIR value; and
(d) determining the symbol timing in the received signals based on the integrated summed CIR value;
a plurality of integrated summed CIR values are generated corresponding to a plurality of different instances of the specified window, each instance corresponding to integrating a different set of summed CIR values for the plurality of channels; and
the determined symbol timing is based on selecting a maximum integrated summed CIR value of the plurality of integrated summed CIR values.

15. The receiver of claim 14, wherein each CIR value corresponds to power of the CIR, wherein each CIR value is based on a correlation between a corresponding received signal and a known training sequence.

16. The receiver of claim 14, wherein the specified window has a duration substantially equal to the length of a guard interval of symbols in the received signals.

17. The receiver of claim 14, wherein the specified window has a duration substantially equal to a maximum tolerable delay spread for the received signals.

18. The receiver of claim 14, wherein each transform is a discrete Fourier transform (DFT), wherein timing of the DFT is based on the determined symbol timing.

19. The receiver of claim 14, wherein the plurality of channels used by the at least one receiver branch corresponds to a single antenna of the receiver.

20. The receiver of claim 19, wherein a different symbol timing is determined for each different receiver antenna.

21. The receiver of claim 20, wherein:
timing of the processing of the received signals for each different receiver antenna is based on the maximum symbol timing for all of the receiver antennas; and
at least one received signal is delayed based on a timing difference between the maximum symbol timing and the symbol timing determined for said at least one received signal.

22. The receiver of claim 14, wherein a single, joint symbol timing is determined for all of the antennas of the receiver by the at least one receiver branch by:
estimating the CIR value for each of the plurality of channels corresponding to all of the antennas of the receiver;
summing the CIR values for the plurality of channels corresponding to all of the antennas of the receiver to generate the plurality of summed CIR values;
integrating the summed CIR values over a specified window to generate the integrated summed CIR value; and
determining the single, joint symbol timing in the received signals based on the integrated summed CIR value.

23. The receiver of claim 14, wherein the determined symbol timing corresponds to minimal CIR power falling outside of the specified window and maximal CIR power falling inside the specified window.

24. In a receiver of a multiple-input multiple-output (MIMO) system, the receiver having a plurality of receiver antennas, a method comprising:

(a) receiving signals from a plurality of transmitter antennas;

(b) for each of a plurality of channels originating from the transmit antennas, estimating a CIR value characterizing channel impulse response (CIR) of the channel;

(c) summing the CIR values for the plurality of channels;

(d) integrating the summed CIR values over a specified window;

(e) determining symbol timing in the received signals based on the integrated summed CIR value; and (f) processing the received signals based on the determined symbol timing, wherein:

the plurality of channels corresponds to a single antenna of the receiver;

a different symbol timing is determined for each different receiver antenna;

timing of the processing of the received signals for each different receiver antenna is based on the maximum symbol timing for all of the receiver antennas; and at least one received signal is delayed based on a timing difference between the maximum symbol timing and the symbol timing determined for said at least one received signal.

25. In a receiver of a multiple-input multiple-output (MIMO) system, the receiver having a plurality of receiver antennas, a method comprising:

(a) receiving signals from a plurality of transmitter antennas;

(b) for each of a plurality of channels originating from the transmit antennas, estimating a CIR value characterizing channel impulse response (CIR) of the channel;

(c) summing the CIR values for the plurality of channels;

(d) integrating the summed CIR values over a specified window;

(e) determining symbol timing in the received signals based on the integrated summed CIR value, wherein the determined symbol timing corresponds to minimal CIR power falling outside of the specified window and maximal CIR power falling inside the specified window; and (f) processing the received signals based on the determined symbol timing.

* * * * *